United States Patent
MacNally et al.

(10) Patent No.: US 6,735,418 B1
(45) Date of Patent: May 11, 2004

(54) ANTENNA INTERFACE

(75) Inventors: Donald E. MacNally, San Francisco, CA (US); Thomas B. Cho, Alameda, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/527,314

(22) Filed: Mar. 16, 2000

Related U.S. Application Data (60) Provisional application No. 60/135,467, filed on May 24, 1999.

(51) Int. Cl.$^7$ .................................................. H04B 1/44
(52) U.S. Cl. .............................. 455/78; 455/80; 455/82
(58) Field of Search .............................. 455/73, 80, 82, 455/83, 319, 333, 78, 79, 84; 370/280; 333/103, 104, 105

(56) References Cited

U.S. PATENT DOCUMENTS

| | | | | |
|---|---|---|---|---|
| 4,055,807 A | | 10/1977 | Priniski et al. | |
| 4,682,176 A | * | 7/1987 | Jones | 342/175 |
| 5,375,256 A | * | 12/1994 | Yokoyama et al. | 455/80 |
| 5,515,364 A | * | 5/1996 | Fague | 370/278 |
| 5,521,561 A | * | 5/1996 | Yrjola et al. | 333/103 |
| 5,678,199 A | * | 10/1997 | Birth et al. | 455/80 |
| 5,903,820 A | * | 5/1999 | Hagstrom | 455/82 |
| 5,923,647 A | * | 7/1999 | Dolman et al. | 370/280 |
| 6,009,314 A | * | 12/1999 | Bjork et al. | 455/83 |
| 6,026,280 A | * | 2/2000 | Yokomura | 455/78 |
| 6,026,286 A | * | 2/2000 | Long | 455/319 |
| 6,226,275 B1 | * | 5/2001 | Yang et al. | 370/280 |
| 6,301,467 B1 | * | 10/2001 | Jarvinen et al. | 330/51 |

FOREIGN PATENT DOCUMENTS

| | | |
|---|---|---|
| EP | 0 333 419 A2 | 9/1989 |
| EP | 0 883 241 A1 | 12/1998 |
| WO | WO 00/72457 A1 * 11/2000 | ............ H04B/1/48 |

* cited by examiner

*Primary Examiner*—Charles Appiah
(74) *Attorney, Agent, or Firm*—Michael A. Proksch (57) ABSTRACT

An antenna interface for a Time Division Duplex (TDD) radio transceiver allows a transceiver to be attached to an antenna/filter without the need for an antenna switch. The antenna interface includes a single Balun circuit to convert a single-ended signal to/from differential signals, and a single impedance matching circuit to match an impedance at an output of the single Balun circuit with an input impedance of a Low Noise Amplifier (LNA) of a receiver and to provide an output impedance of a Power Amplifier (PA) of a transmitter. The single impedance matching circuit is coupled to both the LNA and the PA. The LNA and the PA are based on CMOS technology and made within a single integrated circuit.

8 Claims, 6 Drawing Sheets

ANTENNA INTERFACE

RELATED APPLICATIONS

This application claims the benefit of Provisional Application, U.S. Ser. No. 60/135,467, filed on May 24, 1999, entitled to "ANTENNA INTERFACE", by Donald E. MacNally, Thomas B. Cho.

FIELD OF THE INVENTION

The invention relates generally to a Time Division Duplex (TDD) radio transceiver, more particularly, to an antenna interface for a Time Division Duplex (TDD) radio transceiver.

BACKGROUND OF THE INVENTION

Traditionally, a radio transceiver requires both a Low Noise Amplifier (LNA) for clear reception of a radio signal transmitted to the transceiver and a Power Amplifier (PA) for transmitting a radio signal from the transceiver over long distances.

In a Time Division Duplex (TDD) transceiver, a transmitter and a receiver are not utilized simultaneously. Typically, when the transmitter of a transceiver is on, the receiver of the transceiver is off. Likewise, when the receiver is on, the transmitter is off. For a typical TDD transceiver, to conserve power, the receiver Low Noise Amplifier (LNA) is powered down during a transmit cycle, and the transmit power amplifier (PA) is powered down during a receive cycle.

In the past, a LNA and a PA in a transceiver have been discrete components, and they have been designed independently from each other for their own optimum performance. Therefore, a LNA and a PA have been using their own set of different matching components to interface with an antenna. For example, a LNA is designed to use its own set of matching components to match its input impedance to an antenna impedance to obtain the maximum power transfer for a received signal from an antenna to a LNA. On the other hand, a PA is designed to use its own set of matching components to obtain a required output load impedance to maximize its power amplification with maximum efficiency.

Recently, as Integrated Circuit (IC) technologies improve, much effort has been made to integrate as many functional blocks as possible on a single chip to reduce its cost and size. Integration of a LNA and a PA onto a single chip often requires careful attention. For example, if a LNA and a PA use different pins, then an antenna switch is required to toggle between a LNA input and a PA output in a TDD system. However, an antenna switch is costly and will still adversely attenuate the transmit and receive signals somewhat. In addition, a control circuit must be used to switch the antenna switch between a transmit cycle and a receive cycle. Also, a Balun (Balanced/Unbalanced) circuit is used if a LNA and a PA are differential. A Balun circuit and an impedance matching circuit are used in both transmit and receive paths. Furthermore, twice as much transceiver Integrated Circuit (IC) package pins are needed to interface the transceiver with the impedance matching circuits for transmitting and receiving signals. The extra Balun circuit, the extra impedance matching circuit, and the extra transceiver IC package pins make a TDD transceiver system large in size and much more expensive.

It is with respect to these and other considerations that the present invention has been made.

SUMMARY OF THE INVENTION

In accordance with this invention, the above and other problems were solved by providing an antenna interface that allows a transceiver to be attached to an antenna/filter without the need for an antenna switch.

In one embodiment, an antenna interface for a transceiver in accordance with the principles of the present invention includes only one Balun circuit to convert a single-ended signal to/from differential signals, and only one impedance matching circuit to match an impedance at an output of the Balun circuit with an input impedance of a Low Noise Amplifier (LNA) of a receiver and to provide an output load impedance required by a Power Amplifier (PA) of a transmitter, wherein the impedance matching circuit is coupled to both the LNA and the PA. The LNA and the PA are based on CMOS technology and made within a single integrated circuit.

In one embodiment, a Time Division Duplex (TDD) transceiver system in accordance with the principles of the present invention includes an antenna for receiving and transmitting a signal; a bandpass filter to filter out noise received from the antenna; an antenna interface coupled between the bandpass filter and a transceiver; and the transceiver including a receiver Low Noise Amplifier (LNA) to amplify a signal received from the bandpass filter and a transmit Power Amplifier (PA) to amplify a signal transmitted to the bandpass filter. The antenna interface includes only one Balun circuit, coupled to the bandpass filter, to convert a single-ended signal to/from differential signals; and only one impedance matching circuit, coupled to the Balun circuit and the transceiver, to match an impedance at an output of the Balun Circuit with an input impedance of a Low Noise Amplifier (LNA) of a receiver and to provide an output load impedance required by a Power Amplifier (PA) of a transmitter, wherein the impedance matching circuit is coupled to both the LNA and the PA. The LNA and the PA are based on CMOS technology and made within a single integrated circuit.

In another embodiment, an antenna interface between an antenna and a transceiver in accordance with the principles of the present invention includes only one impedance matching circuit to match an antenna impedance with an input impedance of a Low Noise Amplifier (LNA) of a receiver and to provide an output load impedance required by a Power Amplifier (PA) of a transmitter, wherein the impedance matching circuit is coupled to both the LNA and the PA. The LNA and the PA are based on CMOS technology and made within a single integrated circuit.

In another embodiment, a Time Division Duplex (TDD) transceiver system in accordance with the principles of the present invention includes an antenna for receiving and transmitting a signal; a bandpass filter to filter out noise received from the antenna; an antenna interface coupled between the bandpass filter and a transceiver; and the transceiver including a receiver Low Noise Amplifier (LNA) to amplify a signal received from the bandpass filter and a transmit Power Amplifier (PA) to amplify a signal transmitted to the bandpass filter. The antenna interface includes only one impedance matching circuit, coupled to bandpass filter and the transceiver, to match an impedance at an output of the bandpass filter with an input impedance of a Low Noise Amplifier (LNA) of a receiver and to provide an output load impedance required by a Power Amplifier (PA) of a transmitter, wherein the impedance matching circuit is coupled to both the LNA and the PA. The LNA and the PA are based on CMOS technology and made within a single integrated circuit.

These and various other features as well as advantages which characterize the present invention will be apparent from a reading of the following detailed description and a review of the associated drawings.

BRIEF DESCRIPTION OF THE DRAWINGS

Referring now to the drawings in which like reference numbers represent corresponding parts throughout.

DETAILED DESCRIPTION

In the following description of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

The present invention allows for a transmitter and a receiver in a Time Division Duplex (TDD) transceiver to be attached to an antenna/filter port without the need for an antenna switch. The present invention provides an antenna interface which combines a Low Noise Amplifier (LNA) input and a Power Amplifier (PA) output into a single path so that external components, such as a Balun circuit and an impedance matching circuit, can be shared.

In a Time Division Duplex (TDD) transceiver system, a transmitter and a receiver are not utilized simultaneously. In operation, when the transmitter is on in a transmit cycle, the receiver is off; and when the receiver is on in a receive cycle, the transmitter is off. In a transmit cycle, the receiver's Low Noise Amplifier (LNA) is powered down to conserve power. In a receive cycle, the transmitter's Power Amplifier (PA) is powered down to conserve power.

One of the challenges in radio communication art is to find ways to get the most power possible to generate and transmit a signal. Most transmitters are preferably designed to provide maximum power output and efficiency into a 50-ohm load. Some antennas can provide a 50-ohm load to the transmitter over a wide range of frequencies. These antennas can be connected directly to the transmitters. Other antennas have impedances that vary widely with frequency and the surrounding environment. In these cases, an antenna interface must be used. Also, a Low Noise Amplifier in a receiver requires impedance matching so as not to attenuate an input signal from the antenna.

Figure 1:
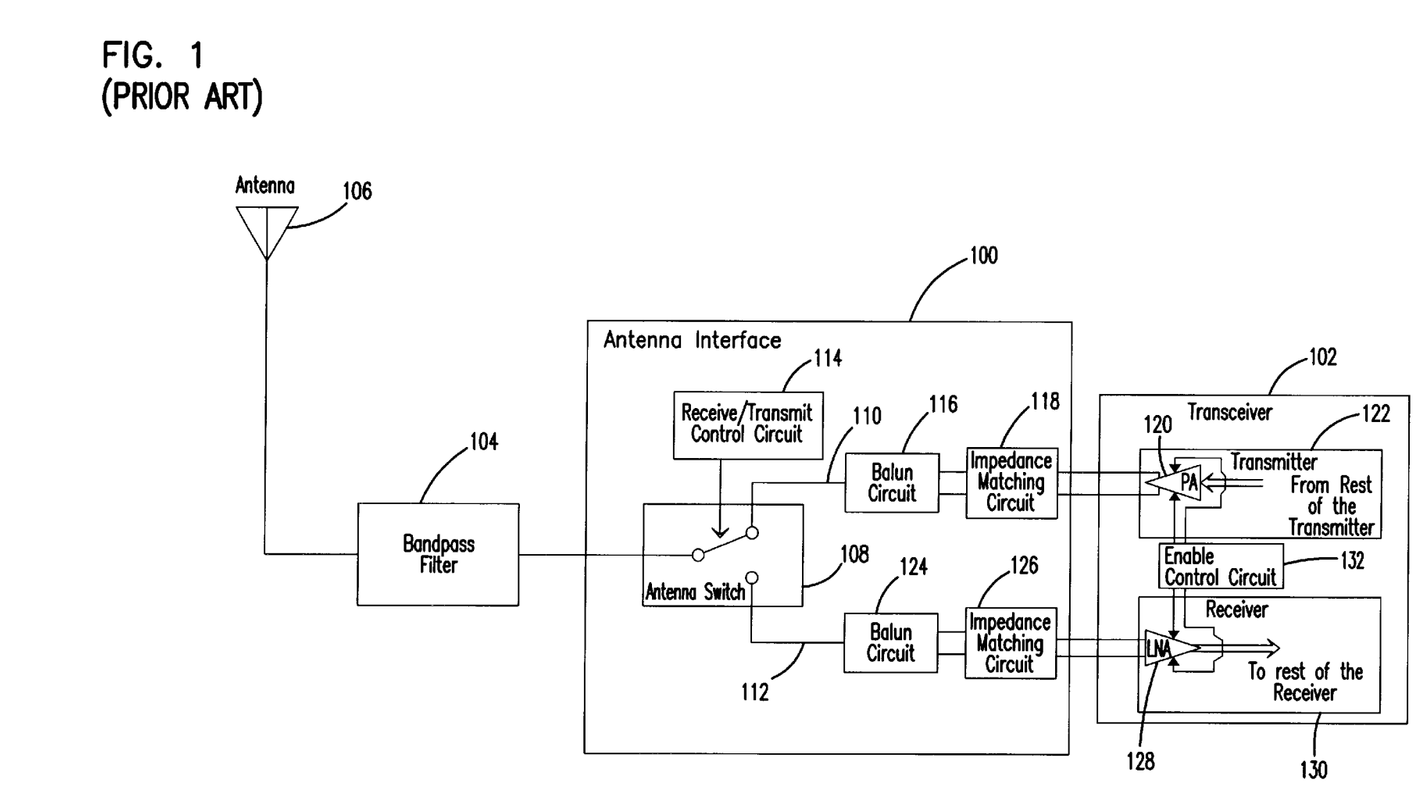
FIG. 1 illustrates a typical antenna interface for a Time Division Duplex (TDD) radio transceiver.

FIG. 1 illustrates a typical antenna interface 100 for a Time Division Duplex (TDD) radio transceiver 102. The antenna interface 100 is coupled between a bandpass filter 104 and the transceiver 102. The bandpass filter 104 is further coupled to an antenna 106.

The antenna interface 100 includes an antenna switch 108 switching between a transmit path 1 10 and a receive path 112. The antenna switch 108 is controlled by a receive/transmit control circuit 114. In a transmit cycle, the antenna switch 108 is switched to couple to the transmit path 110. In a receive cycle, the antenna switch 110 is switched to couple to the receive path 112.

In the transmit path 110, the antenna interface 100 includes a Balun (Balanced/Unbalanced) circuit 116 which converts an unbalanced signal to balanced signals, i.e. converting differential signals to a single-ended signal. In addition, an impedance matching circuit 118 is coupled to the Balun circuit 116 to provide the optimum impedance at the PA output so that maximum power of the transmitted signal from the transceiver 102 can be delivered to the antenna 106.

In the receive path 112, the antenna interface 100 includes a Balun (Balanced/Unbalanced) circuit 124 which converts the balanced signals to an unbalanced signal, i.e. converting a single-ended signal to differential signals. In addition, an impedance matching circuit 126 is coupled to the Balun circuit 124 to match impedance at the output of the Balun circuit 124 with an input impedance of the Low Noise Amplifier (LNA) 128 of the receiver 130. When impedance is matched, maximum power of a signal is transferred from the antenna 106 to the transceiver 102.

The receive/transmit control circuit 114 controls the transition between a transmit cycle and a receive cycle such that the antenna switch toggles between a transmit cycle and a receive cycle. The transceiver 102 may include an enable control circuit 132 which controls the power on/off for the PA 120 and the LNA 128.

As described above, the antenna switch 108 is costly and will still adversely attenuate the transmit and receive signals somewhat. In addition, the receive/transmit control circuit 114 must be used to switch the antenna switch 108 between a transmit cycle and a receive cycle. Further, two Balun (Balanced/Unbalanced) circuits and two impedance matching circuits have to be used in the antenna interface 100 if the LNA and PA are differential. Furthermore, the pins for the transceiver 102 Integrated Circuit (IC) package are doubled, for example, four pins for balanced signals. The extra Balun circuit, the extra impedance matching circuit, and the extra transceiver IC package pins increase the size and cost of the transceiver 102.

Figure 2:
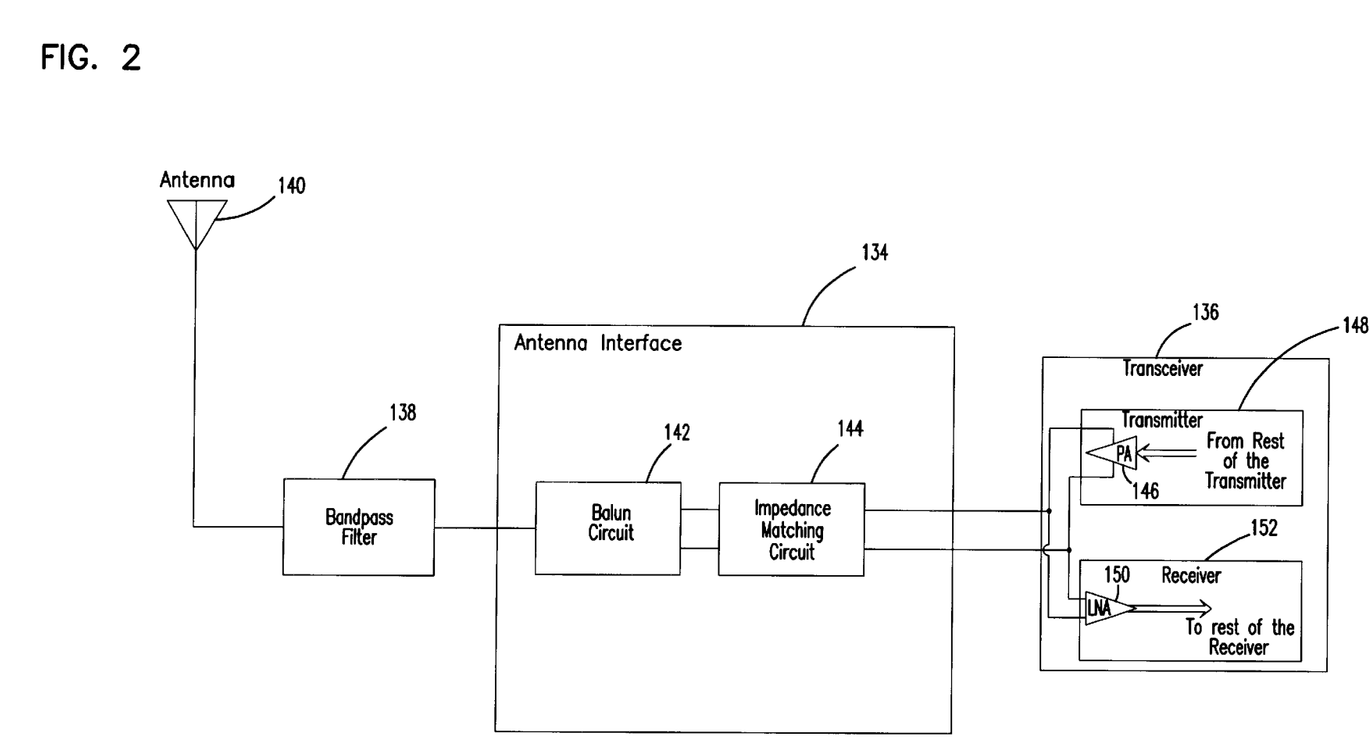
FIG. 2 illustrates a block diagram of one embodiment of an antenna interface for a Time Division Duplex (TDD) radio transceiver in accordance with the principles of the present invention.

FIG. 2 illustrates a block diagram of one embodiment of an antenna interface 134 for a Time Division Duplex (TDD) radio transceiver 136 in accordance with the principles of the present invention. The antenna interface 134 is coupled between a bandpass filter 138 and the transceiver 136. The bandpass filter 138 is further coupled to an antenna 140.

The antenna interface 134 includes a single Balun (Balanced/Unbalanced) circuit 142 which converts an unbalanced single-ended signal to balanced differential signals in a receive cycle and converts balanced differential signals to an unbalanced single-ended signal in a transmit cycle. The antenna interface 134 also includes an impedance matching circuit 144 coupled to the Balun circuit 142 to match the impedance at the output of the Balun circuit 142 with an input impedance of a Low Noise Amplifier (LNA) 150 of a receiver 152 and to provide an output load impedance required by a Power Amplifier (PA) 146 of a transmitter 148. When the impedance is matched at the antenna interface, maximum power of a transmit/receive signal is transferred from/to the antenna 106 to/from the transceiver 102.

The PA 146 and LNA 150 are based on CMOS technology and made within a single integrated circuit (IC). The detailed circuit designs of the PA 146 and LNA 150, the bandpass filter 138, and the antenna 140 can be implemented in various ways known in the art and are not the focus of the present invention.

Figure 3:
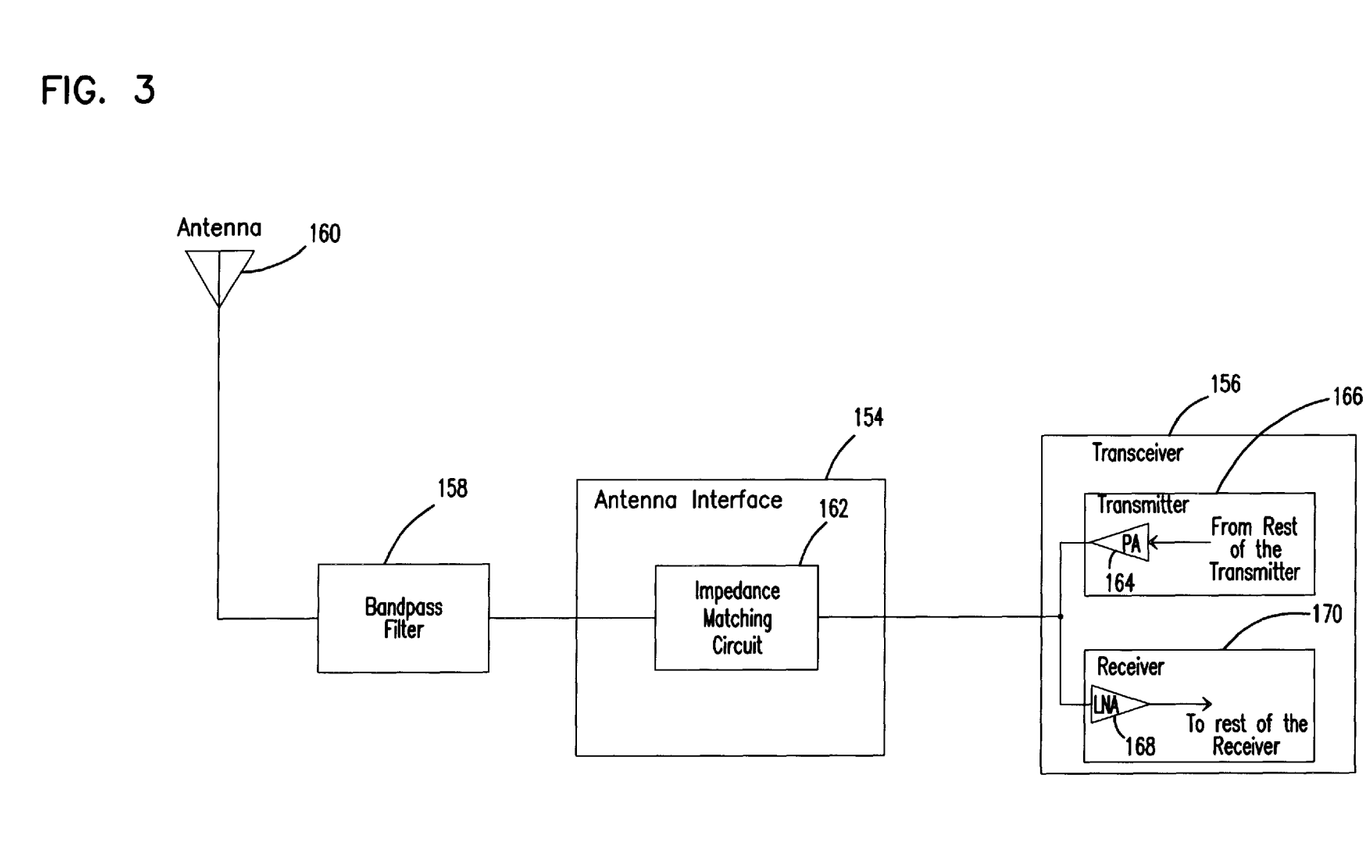
FIG. 3 illustrates a block diagram of another embodiment of an antenna interface for a Time Division Duplex (TDD) radio transceiver in accordance with the principles of the present invention.

FIG. 3 illustrates a block diagram of an alternative embodiment of an antenna interface 154 for a Time Division Duplex (TDD) radio transceiver 156 in accordance with the principles of the present invention. The transceiver 156 can be the same as the transceiver 136 shown in FIG. 2. Similarly, a bandpass filter 158 and an antenna 160 can be the same as the bandpass filter 138 and the antenna 140 shown in FIG. 2. In FIG. 3, the Balun circuit is not used. The signal is a single-ended unbalanced signal, i.e. the signal is not converted to balanced differential signals. Accordingly, the antenna interface 154 includes only one impedance matching circuit 162 which is coupled between the bandpass filter 158 and the transceiver 156. A PA 164 of a transmitter 166 and a LNA 168 of a receiver 170 share one impedance matching circuit 162 in the antenna interface 154.

Figure 4:
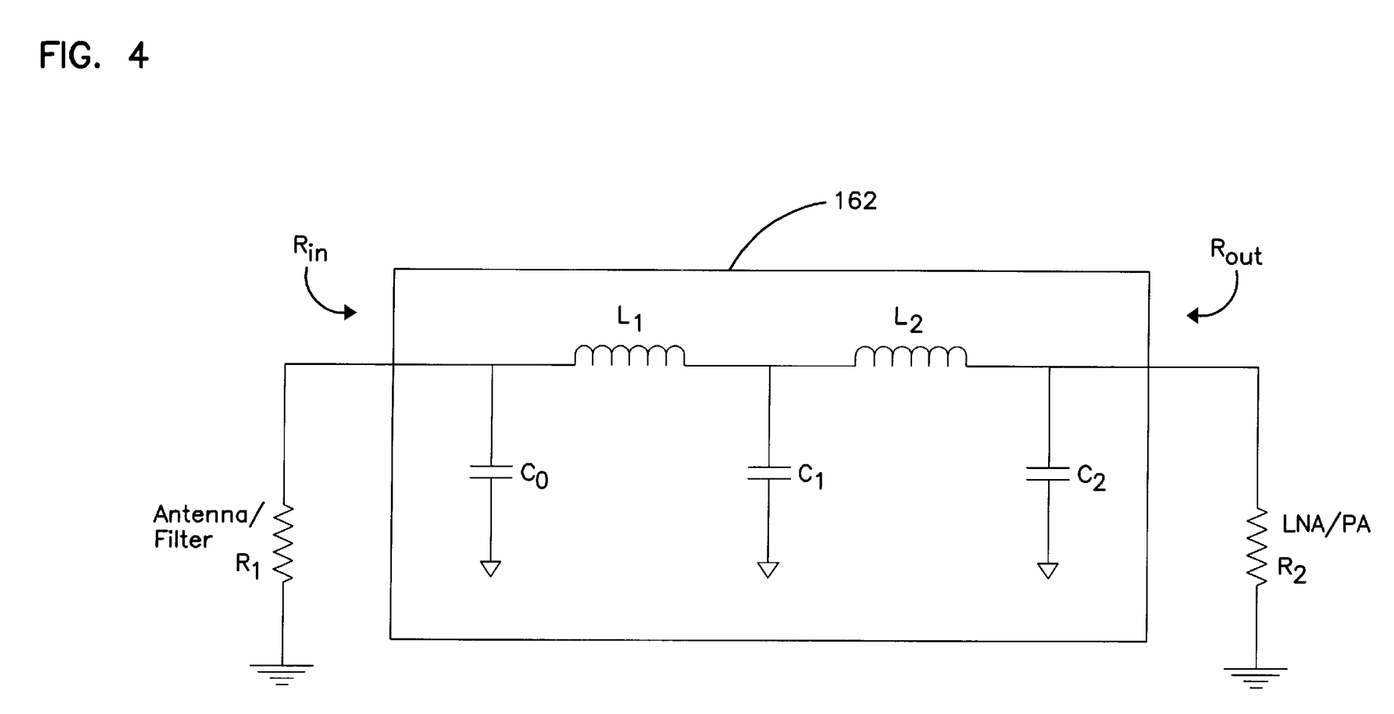
FIG. 4 illustrates a circuit diagram of one embodiment of an impedance matching circuit of an antenna interface in accordance with the principles of the present invention.

FIG. 4 illustrates a circuit diagram of one embodiment of an impedance matching circuit in an antenna interface in accordance with the principles of the present invention. As an example, the impedance matching circuit 162 of a single-ended unbalanced system as shown in FIG. 3 is described herein. It is appreciated that the impedance matching circuit can also be applied to a balanced system within the scope of the present invention.

In FIG. 4, the impedance matching circuit 162 is made up of a combination of inductance and capacitance to transform or match the impedance at the input (Rin) of the circuit 162 and the impedance at the output (Rout) of the circuit 162 in a receive cycle, and to transform or match the impedance at the input (Rout) of the circuit 162 and the impedance at the output (Rin) of the circuit 162 in a transmit cycle. RI represents the impedance of an antenna or antenna/filter. R2 represents an input impedance of the LNA in a receive cycle since in the receive cycle, PA is off and provides high impedance in parallel to the input impedance of the LNA and therefore does not hinder the receive operation. On the other hand, R2 represents an output load impedance of the PA in a transmit cycle since in the transmit cycle, the LNA is off and provides high impedance in parallel to the output load impedance of the PA and therefore does not hinder the transmit operation.

In a receive cycle, the LNA is powered on, and its input impedance sets the value of R2 to match Rout of the circuit 162 so that maximum received signal power can be transferred from the antenna interface to the LNA.

In a transmit cycle, the PA is powered on and delivers the power-amplified signal onto R1 through the impedance matching circuit 162. The PA is designed based on the value of Rout, i.e. R2 in the present invention.

The impedance matching circuit 162 is arranged to provide the desired R2 in both a receive cycle and a transmit cycle. As an example, in a 900 MHz TDD transceiver system, R1 is 50 Ohm, R2 is 100 Ohm, when C0 is 8 pF, C1 is 3 pF, C2 is 3.8 pF, L1 is 7 nH, and L2 is 2 nH. The resistance "looks in" from R1 is 50 Ohm when R2 is 100 Ohm. R2 is 100 Ohm when R1 is 50 Ohm. It is appreciated that other suitable specifications or combinations of Capacitance-Inductance can be used to provide the desired R2 in both a receive cycle and a transmit cycle.

Figure 5:
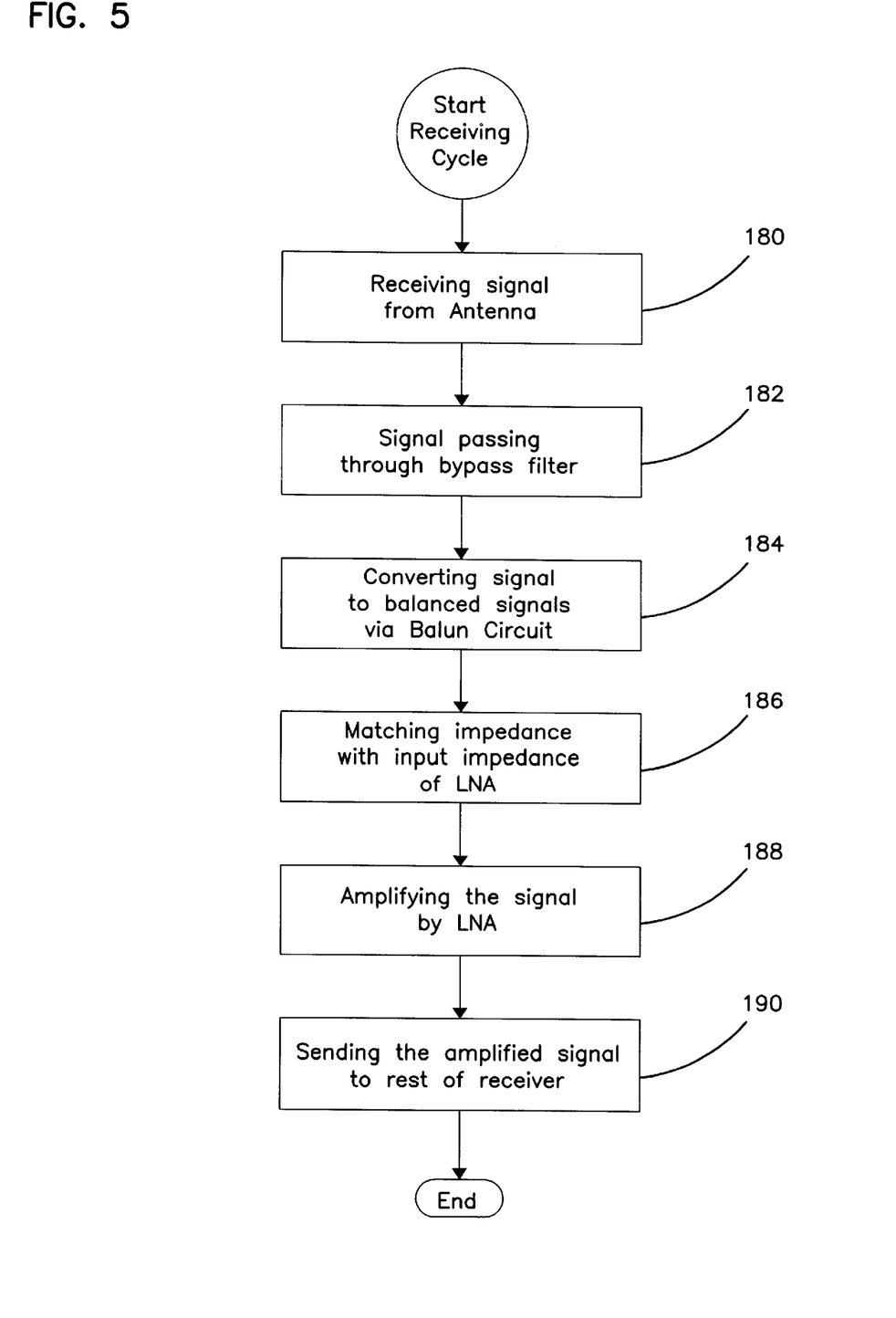
FIG. 5 illustrates a flow chart of operations for receiving a signal in a receive cycle.

FIG. 5 illustrates a flow chart of operations for receiving a signal in a receive cycle. In a receive cycle, an operational flow starts from an operation 180 to receive or detect a signal at an antenna 180. Then, the signal passes through a bandpass filter in operation 182. Next, the signal is converted to balanced differential signals via a Balun circuit in operation 184. Then, the signals are delivered to an impedance matching circuit where the impedance is matched with an input impedance of the LNA in operation 186. Next, the signal is amplified by the LNA in operation 188 and sent to the rest of the receiver in operation 190. Then, the operational flow terminates.

Figure 6:
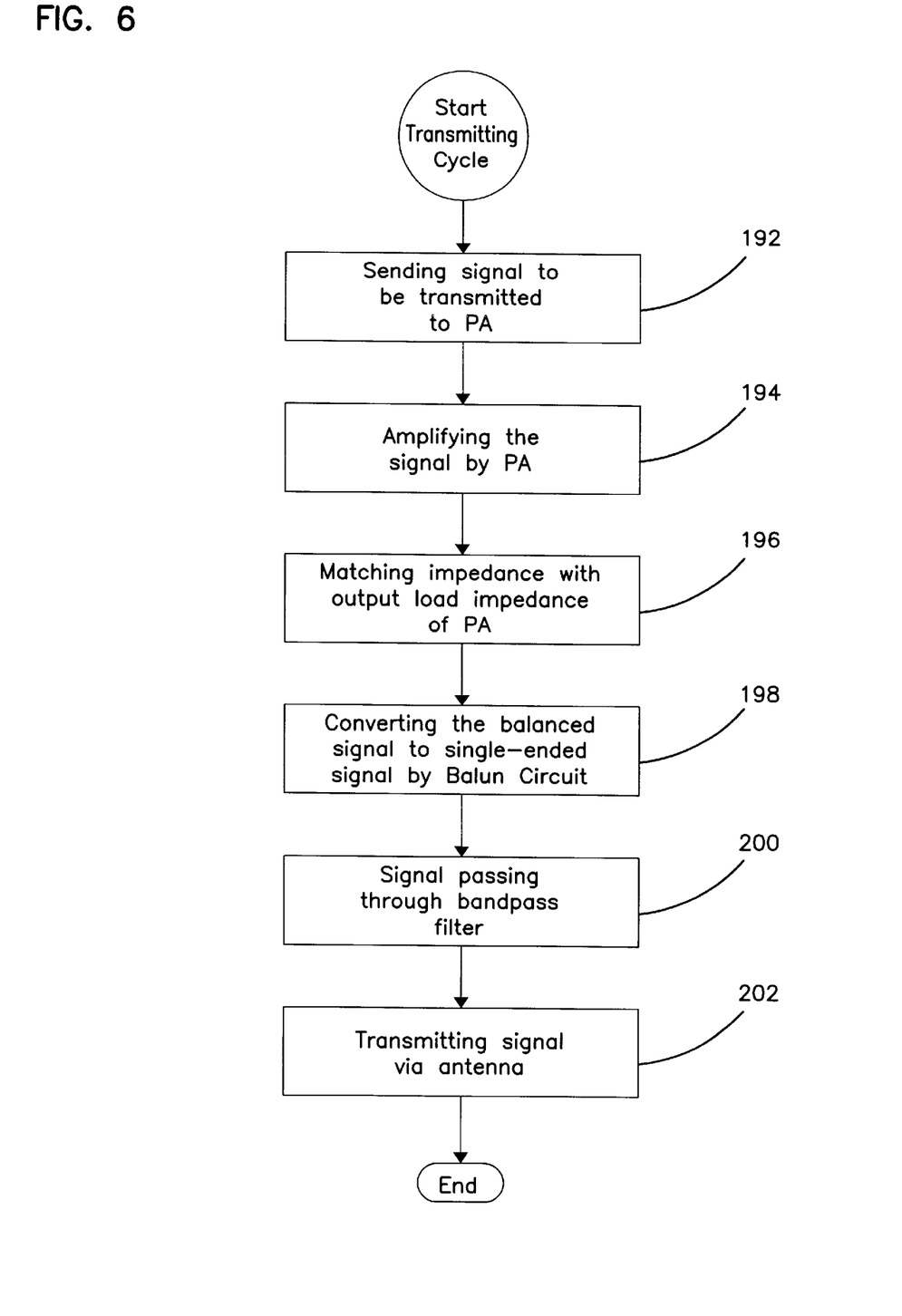
FIG. 6 illustrates a flow chart of operations for transmitting a signal in a transmit cycle.

FIG. 6 illustrates a flow chart of operations for transmitting a signal in a transmit cycle. In a transmit cycle, an operational flow starts from an operation 192 to send a signal to the PA. Next, the signal is amplified by the PA in operation 194. Then, the PA delivers the amplified signal into the impedance matching circuit which provides the output load impedance that the PA requires in operation 196. Next, the balanced differential signals are converted to a single-ended unbalanced signal by the Balun circuit in operation 198. Then, the signal passes through the bandpass filter in operation 200. Next, the signal is transmitted out via the antenna in operation 202. Then, the operational flow terminates.

It is appreciated that in FIGS. 5 and 6, operations 184 and 198 can be optional if a single-ended unbalanced signal is used.

It is also appreciated that the above described inventions can be applied to other suitable devices, such as wireless modems or any other analog/digital transceivers.

Further, it is noted that the terms, such as antenna, antenna interface, etc., are merely used to illustrate a specific TDD radio transceiver. It is appreciated that other suitable receiving/transmitting devices and interfaces can be used to implement the present invention.

In the preferred embodiments shown in FIGS. 2–4, coupling lines or wires are used to connect various devices or components. It will be appreciated to a person skilled in the art that the coupling lines or wires can be replaced by infrared or other suitable wireless coupling devices to achieve the principles of the present invention.

It is to be understood that even though numerous characteristics and advantages of various embodiments of the present invention have been set forth in the foregoing description, together with details of the structure and function of various embodiments of the invention. This disclosure is illustrative only, and changes may be made in detail within the principles of the present invention to the full extent indicated by the broad general meaning of the terms in which the appended claims are expressed.

What is claimed is:

1. An antenna interface between an antenna and a transceiver having a receiver and a transmitter, comprising:

a single impedance matching circuit to match an impedance of the antenna with an input impedance of a Low Noise Amplifier (LNA) of the receiver in a receive cycle and to provide an output load impedance of a Power Amplifier (PA) of the transmitter in a transmit cycle, the single impedance matching circuit being coupled to both the LNA and the PA without an intervening switch therebetween;

wherein the PA is off in the receive cycle and provides high impedance in parallel to the input impedance of the LNA, and the LNA is off in the transmit cycle and provides high impedance in parallel to the output load impedance of the PA.

2. The antenna interface of claim 1, wherein the LNA and the PA are based on CMOS technology and made within a single integrated circuit.

3. A Time Division Duplex (TDD) transceiver system, comprising:
- an antenna for receiving and transmitting a signal;
- a bandpass filter to filter out noise received from the antenna;
- an antenna interface coupled between the bandpass filter and a transceiver; and
- the transceiver including a receiver having a Low Noise Amplifier (LNA) to amplify a signal received from the antenna interface, and a transmitter having a Power Amplifier (PA) to amplify a signal transmitted to the antenna interface, the receiver and the transmitter being part of a single integrated circuit; and
- the antenna interface comprising:
  - a single impedance matching circuit, coupled between the bandpass filter and the transceiver, to match an impedance at an output of the bandpass filter with an input impedance of the Low Noise Amplifier (LNA) of the receiver and to provide an output load impedance of the Power Amplifier (PA) of the transmitter; and
  - wherein the single impedance matching circuit is coupled to both the LNA and the PA without an intervening switch therebetween.

4. The Time Division Duplex (TDD) transceiver system of claim 3, wherein the LNA and the PA are based on CMOS technology.

5. An antenna interface for a transceiver having a transmitter and a receiver, comprising:
- a single Balun circuit to convert a single-ended signal to/from differential signals;
- a single impedance matching circuit to match an impedance at an output of the single Balun circuit with an input impedance of a Low Noise Amplifier (LNA) of the receiver in a receive cycle and to provide an output load impedance of a Power Amplifier (PA) of the transmitter in a transmit cycle, the single impedance matching circuit being coupled to both the LNA and the PA;
- wherein the PA is off in the receive cycle and provides high impedance in parallel to the input impedance of the LNA, and the LNA is off in the transmit cycle and provides high impedance in parallel to the output load impedance of the PA.

6. The antenna interface of claim 5, wherein the LNA and the PA are based on CMOS technology and made within a single integrated circuit.

7. A Time Division Duplex (TDD) transceiver system, comprising:
- an antenna for receiving and transmitting a signal;
- a bandpass filter to filter out noise received from the antenna;
- an antenna interface coupled between the bandpass filter and a transceiver;
- the transceiver including a receiver having a Low Noise Amplifier (LNA) to amplify a signal received from the antenna interface, and a transmitter having a Power Amplifier (PA) to amplify a signal transmitted to the antenna interface; and
- the antenna interface comprising:
  - a single Balun circuit, coupled to the bandpass filter, to convert a single-ended signal to/from differential signals;
  - a single impedance matching circuit, coupled to the Balun circuit and the transceiver, to match an impedance at an output of the single Balun circuit with an input impedance of the Low Noise Amplifier (LNA) of the receiver and to provide an output load impedance of the Power Amplifier (PA) of the transmitter; and
  - wherein the single impedance matching circuit is coupled to both the LNA and the PA without an intervening switch therebetween.

8. The Time Division Duplex (TDD) transceiver system of claim 7, wherein the LNA and the PA are based on CMOS technology and made within a single integrated circuit.

* * * * *